June 24, 1924.
J. A. PRESTWICH
GAUGING INSTRUMENT
Filed Jan. 14, 1919
1,498,750
2 Sheets-Sheet 1
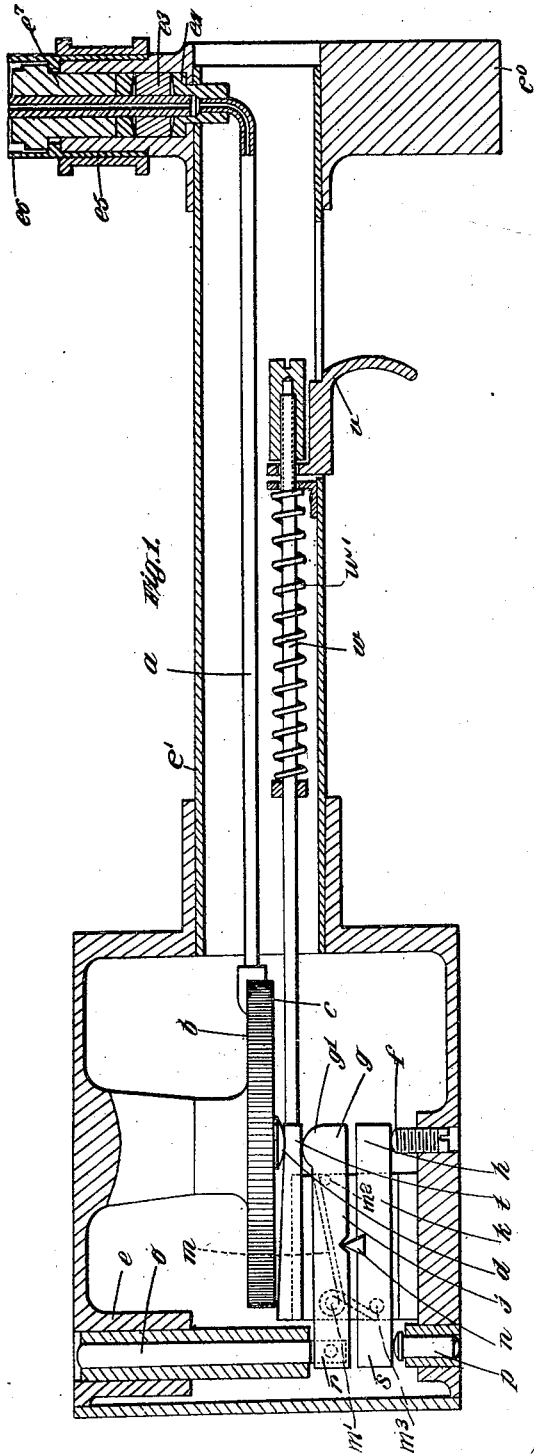
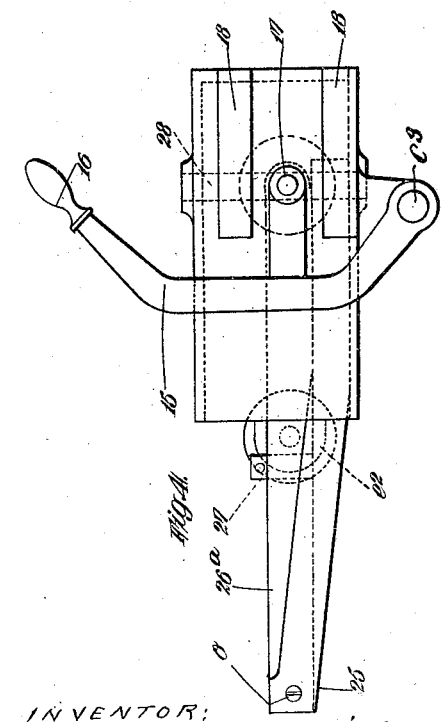
INVENTOR:
John Alfred Prestwich
By Wm Wallace White
ATTY.

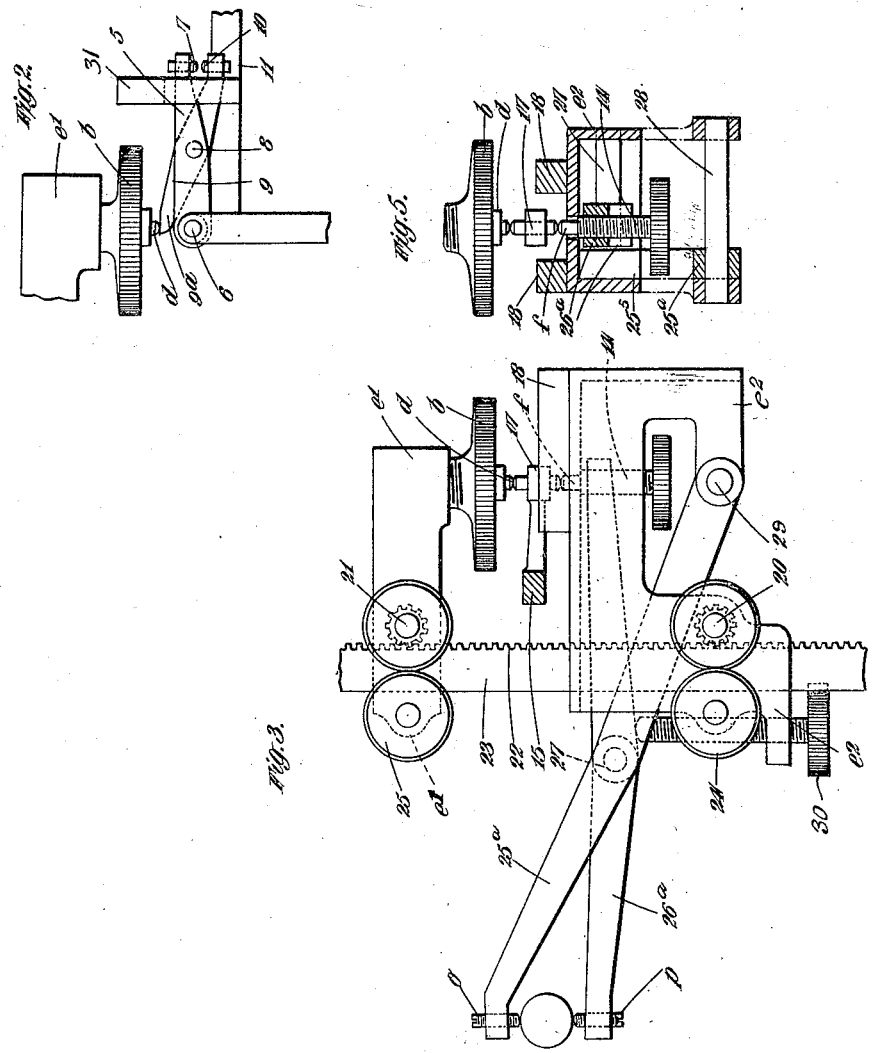

Patented June 24, 1924.

1,498,750

UNITED STATES PATENT OFFICE.

JOHN ALFRED PRESTWICH, OF TOTTENHAM, LONDON, ENGLAND.

GAUGING INSTRUMENT.

Application filed January 14, 1919. Serial No. 271,038.

*To all whom it may concern:*

Be it known that I, JOHN ALFRED PRESTWICH, of Northumberland Park, Tottenham, London, N., England, subject of the King of Great Britain and Ireland, have invented certain new and useful Improvements in or Relating to Gauging Instruments, of which the following is a specification.

This invention relates to gauging instruments and more especially to gauging instruments comprising a chamber adapted to be filled with a liquid and having a flexible diaphragm which carries one of the contact pieces, said chamber being provided with an indicating tube and being disposed on a bracket or frame on which is mounted the other contact piece, a micrometer screw being provided for adjusting the distance between the two contact pieces.

The object of this invention is to provide means adapted to be used in conjunction with gauges for gauging articles which cannot be placed or cannot be readily placed between the contact pieces.

A gauging instrument made in accordance with this invention is characterized in that the ends of a pair of levers are placed between and bear directly or indirectly on the contact pieces of the instrument, the other ends of the levers bearing directly or indirectly upon the work to be gauged, these levers being pivoted on one another, forming a floating combination of levers, adapted to turn on one fixed pivot on the frame, wherein the gauging points on the work can together float or move a limited distance without affecting the contact pieces of the instrument.

Referring to the drawings filed herewith:—

Fig. 1 is a sectional elevation of one form of apparatus made in accordance with this invention adapted to be held in the hand for use in measuring the internal diameter of cylinders;

Fig. 2 is a part elevation of an instrument adapted to be mounted on a table, for use in measuring piston rings or other articles of a flexible nature;

Fig. 3 is an elevation partly in section of an instrument adapted to be mounted on the bed of a machine for use in measuring work in progress, for instance, work which is being ground;

Fig. 4 is a plan view of the instrument shown in Fig. 3;

Fig. 5 is a part sectional end view of Fig. 3.

In Fig. 1, $a$ is an indicating tube in communication with a chamber $b$ having a flexible diaphragm $c$ provided with a contact piece $d$ which forms one of the contact pieces of the gauge. The chamber $b$ is mounted in a cylindrical casing or frame $e$ which also carries the anvil $f$ which forms the other contact piece of the gauge. Between the contact pieces $d$ and $f$ are disposed the ends $g$ and $h$ of two levers $j$ and $k$ which are adapted to be pressed toward each other by a spring $m$ coiled round a pin on the frame and pressing at one end on another pin near the end of the lever $j$ and on another pin on the frame at the other end of the said spring. One of the levers carries a pivotal point $n$ on which the other lever bears thus forming a floating combination of levers. The end $g$ is provided with a boss $g'$ and the end $h$ pivots on the contact piece $f$. Plungers $o$ and $p$ are adapted to project slightly beyond the cylindrical casing forming gauging points which bear on the work to be measured and the other ends of which bear on or are connected to the ends $r$ and $s$ of the levers $j$ and $k$.

The casing $e$ is extended to form a handle $e^0$ and a casing for the indicating tube $a$, which is held in position by a gland $e^7$, packing $e^3$ and washer $e^4$. A split collar $e^5$ holds a guard $e^6$ securely to the handle $e^0$.

Between the contact piece $d$ and the end $g$ of the lever is disposed a tapered distance piece $t$ adapted to be slid into and out of position by a trigger device $v$ through a rod $w$ pressed by a spring $w'$. The casing $e$ is made slightly smaller than the cylinders to be measured.

In use, the casing is slipped into the cylinder, the gauging points $o$ and $p$ bearing on the inner surface of the cylinder. The tapered distance piece $t$ is now slid to come between the contact piece $d$ and the end $g'$ of the lever $j$ by the trigger $v$ and connecting rod $w$, whereupon the liquid in the chamber $b$ is forced up the indicating tube $a$ which enables the operator to gauge the internal diameter of the cylinder or to ascertain whether it is within the limits of accuracy desired. Should the casing $e$ be held so that its axis is not quite parallel with the axis of the cylinder being gauged, the combination of levers will pivot about the point $f$ eliminating any error which might arise from the instrument being so held.

The object of the tapered piece $t$ is to bring gradually the meniscus of the liquid to the index mark so as to show to a certain extent how far the object tested departs from the standard. The apparatus is first set in connection with a standard cylinder by means of the screw $f$, so that when the tapered piece $t$ is in such a position that the trigger $v$ is at the end of its course, the meniscus is exactly on the index mark. The apparatus is then introduced in the cylinder to be tested (the trigger $v$ being released), and the liquid assumes a certain level. On pulling the trigger to the end of its course, the tapered piece $t$ is now causing the liquid to rise in the tube so that its movement can be observed, and if the cylinder is of correct diameter the meniscus will stop opposite the index mark. The levers $j$ and $k$ may be conveniently described as floating levers moving on one of the contact pieces as a pivot.

Referring to Fig. 2, the chamber $b$ is carried by an arm $e'$, contact piece $d$ being mounted on a diaphragm forming a wall of the chamber. 5 is a lever pivoted at 6 on a fixed bracket secured to the frame of the instrument immediately below the face $d$. On the lever 5 is a gauging point 7. At a point 8, on the lever 5, is pivoted another lever 9 adapted to bear on the contact piece $d$. On the table 11 there is provided an upstanding member 31 which is slotted in order to act as a guide for the levers 5 and 9. The lever 9 carries a gauging point 10 adapted to project above the table 11.

The levers 5 and 9 may be floating levers, that is, a combination of levers pivoted on one another and adapted to turn on one fixed pivot similar to the floating levers described with reference to Fig. 1. The work to be gauged is placed between gauging points 7 and 10, and should the work to be gauged not lie evenly on the table 11, contacts 7 and 10 will follow the work and the end $9^a$ of the lever 9 describing an arc on the pivot 6 and causing the contact piece $d$ to move a distance accurately corresponding with the distance between the gauging points 7 and 10.

Referring to Fig. 3, the chamber $b$ (Figs. 3 and 5) is carried on an arm $e'$ (Fig. 3), one contact piece being mounted on a diaphragm which forms a wall of the chamber. On the frame $e^2$ is pivoted to the rod 28 at 29 a lever $25^a$ on one end of which is disposed a gauging point $o$. To the lever $25^a$ is pivoted at 27 a lever $26^a$ on one end of which is a gauging point $p$ the other end carrying a contact piece $f$ which is adapted to be adjusted by the screw 14. Pivoted at $c^3$ to the frame $e^2$ is a lever 15 (see Figs. 3, 4 and 5), provided with a handle 16 and carrying a sliding distance piece 17 adapted to be slid between the contact pieces $d$ and $f$. The contact $f$ of the adjusting screw 14 lies below the face of the supports or rests 18. The gauging point $p$ on the lever $26^a$ is adapted to bear on the under surface of the work in progress. The relative positions of the arm $e'$ and frame $e^2$ are adapted to be adjusted by pinions 20, 21, working on a rack 22 on the pillar 23 to which they are adapted to be clamped by screws 24, 25. An adjusting screw 30 bears on the lever $26^a$ to bring the points $o$ and $p$ suitably on the work to be gauged.

When it is desired to test the work the lever 15 is moved so as to slide the distance piece 17 between the contact pieces $d$ and $f$, whereupon the gauging points $p$ of the lever $26^a$ is brought to bear against the under side of the work, and end $o$ of the lever $25^a$ is brought into contact with the top side of the work. The movement and position of the contact piece $d$ will depend on the diameter of the work and consequently the operator can ascertain while the work is in progress whether it is within the limits of accuracy desired, or what further grinding or other work must be done to bring the article being made, within the limits. On moving the handle 16 to retract the distance piece 17, the contact $p$ on the lever 26 falls away from the work. The work can then be taken out of the machine and placed between the supports or rests 18 and the face $d$ which become the contact projections for checking the measurement of the work.

What I claim as my invention, and desire to secure by Letters Patent, is:

1. In a measuring instrument having two bearing contact members, a pair of levers pivotally connected to one another intermediate their ends, one end of each of said levers being placed between the bearing contact members and the other ends of the levers operated by the work being measured, the arrangement being such that the contact points on the work can be moved together to a limited extent without affecting the bearing contact members of the instrument.

2. In a measuring instrument having two bearing contact members, a pair of levers pivotally connected to one another intermediate their ends, one end of each of said levers being placed between the bearing contact members and the other ends of the levers operated by the work being measured, the arrangement being such that the contact points on the work can be moved together to a limited extent without affecting the bearing contact members, and a distance piece between one of the contact members and the end of one of the levers.

3. A measuring instrument, comprising a chamber adapted to be filled with liquid, a flexible diaphragm constituting one wall of said chamber, a bearing contact member on said diaphragm, an indicating tube in connection with said chamber, a frame carrying said chamber, a second bearing contact member on said frame, a tapering piece for adjusting the distance between said bearing contact members, a pair of levers pivotally connected to each other and having two ends thereof disposed between said bearing members, the other ends of the levers being operated by the work being measured.

4. A measuring instrument, comprising a chamber adapted to be filled with liquid, a flexible diaphragm constituting one wall of said chamber, a bearing contact member on said diaphragm, an indicating tube in connection with said chamber, a frame carrying said chamber, a second bearing contact member on said frame, a tapering piece for adjusting the distance between said bearing contact members, a pair of levers pivotally connected to each other and having two of their ends disposed between said bearing contact members, the other ends of the levers being operated by the work being measured, and a distance piece between one of the contact members and one end of one of the levers.

5. A measuring instrument, comprising a pair of bearing members movable with respect to the body of the instrument, a combination of levers pivotally connected to each other and forming a contact member operatively connected to both of said bearing members, indicating means, a second contact member, manually-operable means between said contact members for moving the first contact member to actuate said bearing members and to move the second contact member to actuate said indicating means.

6. A measuring instrument, comprising a pair of bearing members movable with respect to the body of the instrument, a combination of levers pivotally connected to each other and forming a contact member operatively connected to both of said bearing members, a diaphragm, a second contact member on the diaphragm, a movable wedge between said contact members, manually operable means for moving said wedge to actuate said contact members, and fluid-indicating means operable by said diaphragm.

In testimony whereof I have signed my name to this specification.

JOHN ALFRED PRESTWICH.